United States Patent

Harada et al.

[11] Patent Number: 5,259,850
[45] Date of Patent: Nov. 9, 1993

[54] GRANULAR TYPE REACTIVE DYE COMPOSITIONS AND METHODS FOR DYEING AND PRINTING CELLULOSE FIBERS USING THE SAME

[75] Inventors: Naoki Harada, Ibaraki; Noriaki Yamauchi, Hirakata; Syuhei Hashizume, Osaka; Yutaka Kayane, Ikoma; Kazumi Yoshigoe, Nishinomiya; Isao Nakamae, Hirakata, all of Japan

[73] Assignee: Sumitomo Chemical Company, Limited, Osaka, Japan

[21] Appl. No.: 745,768

[22] Filed: Aug. 16, 1991

[30] Foreign Application Priority Data

Aug. 28, 1990 [JP] Japan .................. 2-227267

[51] Int. Cl.$^5$ ............ C09B 67/24; C09B 67/26; D06P 31/66
[52] U.S. Cl. ............................... 8/526; 8/524; 8/543; 8/549; 8/618; 8/918
[58] Field of Search ............. 8/524, 526, 549

[56] References Cited

U.S. PATENT DOCUMENTS

| 4,390,342 | 1/1983 | Bruttel et al. | 8/524 |
| 4,465,491 | 8/1984 | Balliello et al. | 8/524 |
| 4,689,048 | 8/1987 | Fortsch et al. | 8/524 |
| 4,802,888 | 2/1989 | Sandefur et al. | 8/524 |
| 4,834,769 | 5/1989 | Dien et al. | 8/436 |
| 5,030,244 | 7/1991 | Neumann et al. | 8/526 |

FOREIGN PATENT DOCUMENTS

| 0024654 | 3/1981 | European Pat. Off. . |
| 0024655 | 3/1981 | European Pat. Off. . |
| 0037382 | 10/1981 | European Pat. Off. . |
| 0057158 | 8/1982 | European Pat. Off. . |
| 2-32166 | 2/1990 | Japan . |

OTHER PUBLICATIONS

Patent Abstracts of Japan, vol. 14, No. 63 (C-685) (4006) Feb. 6, 1990 & JP-A-1 287 176 (Sumitomo Chem) Nov. 17, 1989.

*Primary Examiner*—A. Lionel Clingman
*Attorney, Agent, or Firm*—Stevens, Davis, Miller & Mosher

[57] ABSTRACT

A granular type reactive dye composition containing a reactive dye, an inorganic salt and water, the water content being from 4.5 through 15% by weight and the inorganic salt content being 20% by weight or less, both based on the weight of the composition, which is excellent in storage stability, compatibility with water and hot water, and reproducibility, when used for dyeing or printing cellulose fibers.

6 Claims, No Drawings

GRANULAR TYPE REACTIVE DYE COMPOSITIONS AND METHODS FOR DYEING AND PRINTING CELLULOSE FIBERS USING THE SAME

The present invention relates to a granular type reactive dye composition and a method for dyeing and printing cellulose fibers using the composition.

Hitherto, water-soluble reactive dyes have largely been used for dyeing or printing cellulose fibers. Commercially available reactive dye products are in the form of powder, granule, aqueous liquid, etc. Among them, products in the form of granule are watched with interest from the viewpoint of environmental hygiene, workability, storage stability and transportability.

Generally speaking, reactive dye products manufactured industrially can be put to use in the practical dyeing or printing process usually when several months or in some cases several years has passed after production. Thus, during the period of storage, the products in the form of granule undergo a change in dye concentration and a decomposition of reactive group and therefore a color yield on cellulose fibers decreases and a dyeability deteriorates.

On the dyeing or printing of cellulose fiber, the products in the form of granule must be dissolved in water or hot water according to a known method. In this dissolution procedure, products having poor compatibility with water or hot water at the time of disolving them thereinto (hereinafter referred to as compatibility) results in an insufficient dissolution, which affects the process of dyeing or printing to cause uneven dyeing or printing, and deteriorates the reproducibility of dyeing or printing. In order to avoid such problems, the dissolution procedure is made complex and the dyeing work troublesome.

The present inventors conducted extensive studies to find a granular type reactive dye composition which is excellent in storage stability, compatibility with water or hot water, and solubility in water, and good in dyeing or printing reproducibility.

The present invention provides a granular type composition which comprises a reactive dye, an inorganic salt and water, an inorganic salt content being 20% by weight or less, and a water content being from 4.5% through 15% by weight, based on the weight of the composition, as well as a method for dyeing or printing cellulose fibers using the composition.

The reactive dye used in the present invention has at least one fiber-reactive group in its dye molecule.

In the present invention, the fiber-reactive group is intended to mean those which react with —OH group or —NH— group of fiber under the dyeing conditions to form a covalent bond. Examples of said fiber-reactive group include those having at least one reactive substituent on heterocyclic ring such as pyridine, pyrimidine, pyridazine, oxazine, triazine or the like or on carbocyclic ring such as quinoline, phthalazine, quinazoline, quinoxaline, acridine or the like, and aliphatic reactive groups, and their combinations through an appropriate bridging group.

Among these reactive dyes, those having at least one vinylsulfone type fiber-reactive group represented by $-SO_2CH=CH_2$ or $-SO_2CH_2CH_2Z$ in which Z is a group capable of being split by the action of an alkali, in one molecule are preferably used. Among these dyes, those represented by the following formula (I) in the free acid form:

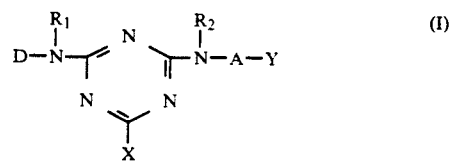

wherein D represents an organic dye residue having at least one sulfo group; $R_1$ and $R_2$ independently represent a hydrogen atom or an optionally substituted alkyl group; A represents an optionally substituted alkylene, phenylene or naphthylene group; X represents a halogen atom, an optionally substituted pyridinio group, $-NR_3R_4$ or $-OR_5$ in which $R_3$, $R_4$ and $R_5$ independently represent a hydrogen atom or an optionally substituted alkyl, phenyl, naphthyl or benzyl group; and Y represents $-SO_2CH=CH_2$ or $-SO_2CH_2CH_2Z$ in which Z is as defined above, are preferable.

In the formula (I), A is preferably a phenylene group optionally having one or two substituent(s) selected from the group consisting of methyl, ethyl, methoxy, ethoxy, chloro, bromo and sulfo or a naphthylene group optionally substituted by sulfo. As concrete examples of A, the followings can be referred to:

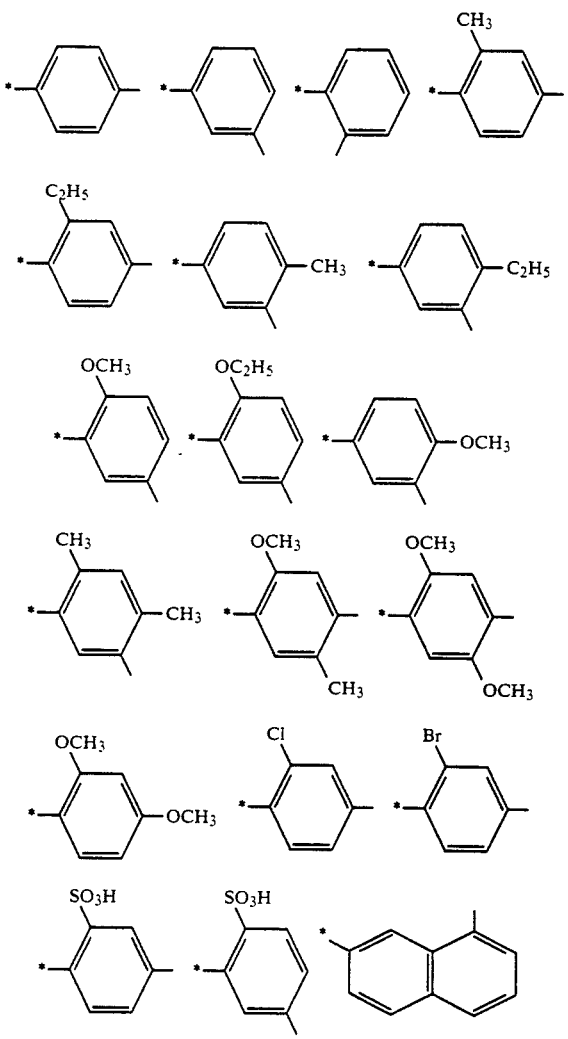

-continued

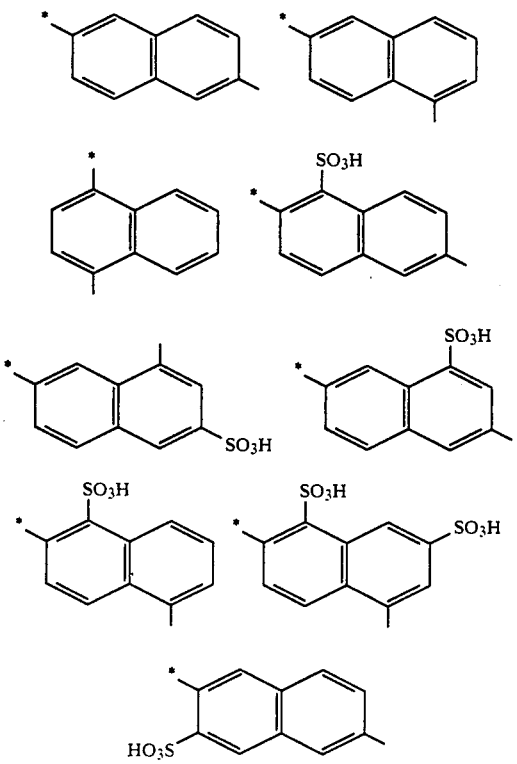

wherein the mark * represents a bond linking to $$-\underset{R_2}{\underset{|}{N}}-.$$

As examples of the alkylene group represented by A, the followings can be referred to:

$$-CH_2-(alk)-\text{*} \quad \text{(a)}$$
$$\quad\quad\quad |$$
$$\quad\quad\quad R'$$

$$-(CH_2)_n-O-(CH_2)_m-\text{*} \quad \text{(b)}$$

$$-(alk')-\underset{R''}{\underset{|}{N}}-(alk')-\text{*} \quad \text{(c)}$$

wherein * is as defined above; alk represents a polymethylene group having 1 to 6 carbon atoms or its branched isomer; R' represents hydrogen, chloro, bromo, fluoro, hydroxy, sulfato, acyloxy having 1 to 4 carbon atoms, cyano, carboxy, alkoxycarbonyl having 1 to 5 carbon atoms or carbamoyl; R'' represents hydrogen or alkyl having 1 to 6 carbon atoms; alk' represents, independently of one another, a polymethylene group having 2 to 6 carbon atoms or its branched isomer, provided that alk' and R'' may be taken together to form a ring through a methylene group; n is an integer of 1 to 6; and m is an integer of 1 to 6.

In the formulas (a), (b) and (c), the polymethylene group represented by alk is preferably methylene, ethylene, methylmethylene, propylene or butylene.

Examples of R'' include hydrogen, methyl, ethyl, propyl, isopropyl, butyl, isobutyl, sec-butyl, tert-butyl, pentyl, hexyl and the like, among which hydrogen is preferable.

The polymethylene group represented by alk' is preferably ethylene, propylene or butylene, and n and m preferably represent, independently of each other, a number of 2, 3 or 4.

Examples of the group capable of being split by the action of an alkali represented by Z include sulfuric ester group, thiosulfuric ester group, phosphoric ester group, acetic ester group, halogen and the like, among which sulfuric ester group is particularly preferable.

As the optionally substituted alkyl represented by $R_1$ and $R_2$, preferable are alkyl groups having 1 to 4 carbon atoms optionally substituted by hydroxy, cyano, $C_1-C_4$ alkoxy, halo, carbamoyl, carboxy, $C_1-C_4$ alkoxycarbonyl, $C_1-C_4$ alkylcarbonyloxy, sulfo or sulfamoyl. As particularly preferable examples of $R_1$ and $R_2$, the followings can be referred to: hydrogen, methyl, ethyl, n-propyl, iso-propyl, n-butyl, iso-butyl, sec-butyl, 2-hydroxyethyl, 2-hydroxypropyl, 3-hydroxyproPyl, 2-hydroxybutyl, 3-hydroxybutyl, 4-hydroxybutyl, 2,3-dihydroxypropyl, 3,4-dihydroxybutyl, cyanomethyl, 2-cyanoethyl, 3-cyanopropyl, methoxymethyl, ethoxymethyl, 2-methoxyethyl, 2-ethoxyethyl, 3-methoxypropyl, 3-ethoxypropyl, 2-hydroxy-3-methoxyproPyl, chloromethyl, bromomethyl, 2-chloroethyl, 2-bromoethyl, 3-chloropropyl, 3-bromopropyl, 4-chlorobutyl, 4-bromobutyl, carboxymethyl, 2-carboxyethyl, 3-carboxypropyl, 4-carboxybutyl, 1,2-dicarboxyethyl, carbamoylmethyl, 2-carbamoylethyl, 3-carbamoylpropyl, 4-carbamoylbutyl, methoxycarbonylmethyl, ethoxycarbonylmethyl, 2-methoxycarbonylethyl, 2-ethoxycarbonylethyl, 3-methoxycarbonylpropyl, 3-ethoxycarbonylpropyl, 4-methoxycarbonylbutyl, 4-ethoxycarbonylbutyl, methylcarbonyloxymethyl, ethylcarbonyloxymethyl, 2-methylcarbonyloxyethyl, 2-ethylcarbonyloxyethyl, 3-methylcarbonyloxypropyl, 3-ethylcarbonyloxypropyl, 4-methylcarbonyloxybutyl, 4-ethylcarbonyloxybutyl, sulfomethyl, 2-sulfoethyl, 3-sulfopropyl, 4-sulfobutyl, sulfamoylmethyl, 2-sulfamoylethyl, 3-sulfamoylpropyl and 4-sulfamoylbutyl.

As preferable examples of the optionally substituted alkyl represented by $R_3$, $R_4$ and $R_5$, alkyl groups having 1 to 4 carbon atoms optionally having one or two substituent(s) selected from the group consisting of $C_1-C_4$ alkoxy, sulfo, carboxy, hydroxy, chloro, phenyl and sulfato are preferable, among which methyl, ethyl, n-propyl, iso-propyl, n-butyl, iso-butyl, sec-butyl, β-hydroxyethyl, β-sulfatoethyl, β-sulfoethyl, β-methoxyethyl, β-carboxyethyl and the like are particularly preferable.

As preferable examples of the optionally substituted phenyl group represented by $R_3$, $R_4$ and $R_5$, phenyl groups optionally having one or two substituent(s) selected from the group consisting of $C_1-C_4$ alkyl, $C_1-C_4$ alkoxy, sulfo, carboxy, chloro and bromo can be referred to, among which 2-, 3- or 4-sulfophenyl, 2,4- or 2,5-disulfophenyl, 2-, 3- or 4-carboxyphenyl, phenyl and the like are particularly preferable.

As preferable examples of the optionally substituted naphthyl group represented by $R_3$, $R_4$ and $R_5$, naphthyl groups optionally having one, two or three substituent(s) selected from the group consisting of hydroxy, carboxy, sulfo, $C_1-C_4$ alkyl, $C_1-C_4$ alkoxy and chloro can be referred to, among which 2-, 3-, 4-, 5-, 6-, 7- or 8-sulfo-1-naphthyl, 1-, 5-, 6-, 7- or 8-sulfo-2-naphthyl, 1,5-, 5,7-, 6,8-, 4,8-, 4,7-, 3,8-, 4,6-, 3,7- or 3,6-disulfo-2-naphthyl, 4,6,8-, 2,4,7- or 3,6,8-trisulfo-1-naphthyl, 1,5,7-, 4,6,8- or 3,6,8-trisulfo-2-naphthyl and the like are particularly preferable.

As preferable examples of the optionally substituted benzyl group represented by $R_3$, $R_4$ and $R_5$, benzyl groups optionally having one or two substituent(s) selected from the group consisting of $C_1$–$C_4$ alkyl, $C_1$–$C_4$ alkoxy, sulfo and chloro can be referred to, among which benzyl, 2-, 3- or 4-sulfobenzyl and the like are particularly preferable.

In the present invention, a case that either one of $R_3$ and $R_4$ is an optionally substituted alkyl, phenyl, naphthyl or benzyl group and the other is a hydrogen atom or a methyl or ethyl group is preferable.

When X is —$NR_3R_4$, examples of compounds represented by the formula $HNR_3R_4$ which can be used for forming such a group X include the followings: ammonia;

aromatic amines such as:
1-aminobenzene,
1-amino-2-, -3- or -4-methylbenzene,
1-amino-3,4- or -3,5-dimethylbenzene,
1-amino-2-, -3- or -4-ethylbenzene,
1-amino-2-, -3- or -4-methoxybenzene,
1-amino-2-, -3- or -4-ethoxybenzene,
1-amino-2-, -3- or -4-chlorobenzene,
3- or 4-aminophenylmethanesulfonic acid,
2-aminobenzenesulfonic acid,
3-aminobenzenesulfonic acid,
4-aminobenzenesulfonic acid,
3-methylaminobenzenesulfonic acid,
3-ethylaminobenzenesulfonic acid,
4-methylaminobenzenesulfonic acid
4-ethylaminobenzenesulfonic acid,
5-aminobenzene-1,3-disulfonic acid,
6-aminobenzene-1,4-disulfonic acid,
6-aminobenzene-1,3-disulfonic acid,
4-aminobenzene-1,2-disulfonic acid,
4-amino-5-methylbenzene-1,2-disulfonic acid,
2-, 3- or 4-aminobenzoic acid,
5-aminobenzene-1,3-dicarboxylic acid,
5-amino-2-hydroxybenzenesulfonic acid,
4-amino-2-hydroxybenzenesulfonic acid,
5-amino-2-ethoxybenzenesulfonic acid,
N-methylaminobenzene,
N-ethylaminobenzene,
1-methylamino-3- or -4-methylbenzene,
1-ethylamino-4-chlorobenzene,
1-ethylamino-3- or -4-methylbenzene,
1-(2-hydroxyethyl)-amino-3-methylbenzene,
3- or 4-methylaminobenzoic acid,
3- or 4-methylaminobenzenesulfonic acid,
2-aminonaphthalene-1-sulfonic acid,
4-aminonaphthalene-1-sulfonic acid,
5-aminophthalene-1-sulfonic acid,
6-aminonaphthalene-1-sulfonic acid,
7-aminonaphthalene-1-sulfonic acid,
8-aminonaphthalene-1-sulfonic acid,
1-aminonaphthalene-2-sulfonic acid,
4-aminonaphthalene-2-sulfonic acid,
5-aminonaphthalene-2-sulfonic acid,
6-aminonaphthalene-2-sulfonic acid,
7-aminonaphthalene-2-sulfonic acid,
7-methylaminonaphthalene-2-sulfonic acid,
7-ethylaminonaphthalene-2-sulfonic acid,
7-butylaminonaphthalene-2-sulfonic acid,
7-isobutylnaphthalene-2-sulfonic acid,
8-aminonaphthalene-2-sulfonic acid,
4-aminonaphthalene-1,3-disulfonic acid,
5-aminonaphthalene-1,3-disulfonic acid,
6-aminonaphthalene-1,3-disulfonic acid,
7-aminonaphthalene-1,3-disulfonic acid,
8-aminonaphthalene-1,3-disulfonic acid,
2-aminonaphthalene-1,5-disulfonic acid,
3-aminonaphthalene-1,5-disulfonic acid,
4-aminonaphthalene-1,5-disulfonic acid,
4-aminonaphthalene-1,6-disulfonic acid,
8-aminonaphthalene-1,6-disulfonic acid,
4-aminonaphthalene-1,7-disulfonic acid,
3-aminonaphthalene-2,6-disulfonic acid,
4-aminonaphthalene-2,6-disulfonic acid,
3-aminonaphthalene-2,7-disulfonic acid,
4-aminonaphthalene-2,7-disulfonic acid,
6-aminonaphthalene-1,3,5-trisulfonic acid,
7-aminonaphthalene-1,3,5-trisulfonic acid,
4-aminonaphthalene-1,3,6-trisulfonic acid,
7-aminonaphthalene-1,3,6-trisulfonic acid,
8-aminonaphthalene-1,3,6-trisulfonic acid, and
4-aminonaphthalene aliphatic amines such as:
methylamine,
ethylamine,
n-propylamine,
isopropylamine,
n-butylamine,
isobutylamine,
sec-butylamine,
dimethylamine,
diethylamine,
methylethylamine,
allylamine,
2-chloroethylamine,
2-methoxyethylamine,
2-aminoethanol,
2-methylaminoethanol,
bis-(2-hydroxyethyl)amine,
2-acetylaminoethylamine,
1-amino-2-propanol,
3-methoxypropylamine,
1-amino-3-dimethylaminopropane,
2-aminoethanesulfonic acid,
aminomethanesulfonic acid,
2-methylaminoethanesulfonic acid,
3-amino-1-propanesulfonic acid,
2-sulfatoethylamine,
aminoacetic acid,
methylaminoacetic acid,
ε-aminocaproic acid,
benzylamine,
2-, 3- or 4-chlorobenzylamine,
4-methylbenzylamine,
N-methylbenzylamine,
2-, 3- or 4-sulfobenzylamine,
2-phenylethylamine,
1-phenylethylamine, and
1-phenyl-2-propylamine.

Among these compounds, the are particularly preferable:
aniline,
N-methylaniline
N-ethylaniline,
2-, 3- or 4-aminobenzenesulfonic acids,
3- or 4-methylaminobenzenesulfonic acid,
3- or 4-ethylaminobenzenesulfonic acid,
6-aminobenzene-1,3- or -1,4-disulfonic acid,
2-, 3- or 4-aminobenzoic acid,
taurine,
N-methyltaurine,
mono- or di-ethanolamine and the like.

When X is —OR$_5$, as compounds represented by the formula R$_5$OH which can be used for forming such a group X, compounds having a hydroxy group in place of the amino group of the above-mentioned compounds can be referred to.

When X is an optionally substituted pyridinio group, its substituents include carboxy, carbamoyl, sulfo, halo and substituted and unsubstituted alkyl groups having 1 to 4 carbon atoms. As examples of the substituted alkyl group, β-hydroxyethyl, β-sulfoethyl and the like can be referred to. As the pyridinio group represented by X, carboxy- and carbamoyl-substituted pyridinio groups are preferable, among which carboxypyridinio group is particularly preferable.

The reactive dyes represented by the formula (I) are in the form of a free acid or a salt thereof. Alkali metal or alkaline earth metal salt is preferable, and sodium salt, potassium salt and lithium salt are particularly preferable.

The reactive dyes represented by the formula (I) which are used in the present invention are known as disclosed in Japanese Patent Publication Nos. 38-23287, 38-10188, 39-18184, Japanese Patent Application Kokai (Laid-Open) Nos. 50-178, 52-74619, 54-72226, 55-39672, 56-92961, 56-128373, 56-163153, 56-90857, 57-18672, 57-57754, 57-212259, 58-49752, 58-80348, etc.

Using these reactive dyes, the gradular type reactive dye composition of the present invention can be obtained by conventional methods. The methods include, for example a method which comprises spray-drying an aqueous solution of the reactive dye, and a method which comprises granulating the reactive dye in a powdery form in a fluidized bed, or using a granulator or the like. According to these methods, the composition can be formulated into granule or grain.

The particle size of the present dye composition is preferably 60 to 1,000 μm and more preferably 100 to 800 μm. If desired, classification using sieves can be applied in order to make even the particle size.

In the present dye composition, a reactive dye content is 65% by weight or more. The water content is 4.5 through 15% by weight and preferably 5 through 10% by weight, and the inorganic salt content is 20% by weight or less, preferably 10% by weight or less, and more preferably 5% by weight or less, all based on the weight of the composition.

Both inorganic salt and water contents can be controlled by any conventional method. For example, the inorganic salt content can be increased by adding an inorganic salt such as sodium sulfate, sodium chloride, lithium chloride or the like to a solution of reactive dye before drying or formulation treatments, and can be reduced by cooling a solution of reactive dye to deposit inorganic salt present therein, or by passing the solution through reverse osmotic membrane. In carrying out the formulation using the solution of reactive dye of which inorganic salt content has been controlled by the use of a spray drier to obtain a granular type composition having a desired water content, inlet temperature of the drier may be adjusted to 110°-300° C., preferably 110°-260° C., its outlet temperature to 60°-140° C., preferably 70°-120° C., more preferably 90°-110° C., and a hot air velocity in the dryer to 80 m/second or less, preferably 10 m/second or less. If the water content after drying is lower than the desired value, a necessary quantity of water may be sprayed onto the granular type dye composition.

The granular type reactive dye composition may further contain dispersing agents, dusting inhibitors, pH buffers, sequestering agents such as polyphosphate, dyeing and printing auxiliaries, and the like.

The present dye composition is preferably one such that a pH value of an aqueous solution prepared from the dye composition and water of 50 times as much as the weight of the dye composition ranges from 3 to 8, preferably 3.5 to 7. A pH buffer may be used for obtaining the desired pH value.

Examples of cellulose fibers to be dyed or printed in accordance with the present invention include natural and regenerated cellulose materials such as cotton, linen, flax, jute, ramie, viscose rayon, Bemberg rayon, and the like and their mixed yarns with other fibers such as polyester and the like.

The dyeing and printing may be conducted according to known processes. In an exhaustion dyeing process, dyeing is carried out by the use of an inorganic salt such as sodium sulfate, sodium chloride and the like and an acid binding agent such as sodium carbonate, sodium bicarbonate, sodium hydroxide, sodium triphosphate and the like, and then the dyed fiber material is washed and dried in a conventional manner. In a cold pad batch dyeing process, padding is carried out by the use of an inorganic salt such as sodium sulfate, sodium chloride and the like and an acid binding agent such as sodium hydroxide, sodium silicate and the like and then the padded material is allowed to stand in a tightly sealed packaging material at a constant temperature for the sake of dyeing, and thereafter it is washed and dried in a conventional manner. In a continuous dyeing process, dyeing is carried out according to a one-bath padding process which comprises adding an acid binding agent such as sodium carbonate, sodium bicarbonate, and sodium hydroxide into a padding solution, carrying out padding according to a known method and then dry-heating or steam-heating the dyed product, or according to two-bath process which comprises padding a fiber material with a padding solution containing the dye, followed by second padding using a solution containing an inorganic salt such as anhydrous sodium sulfate, and sodium chloride, and an acid binding agent such as sodium hydroxide and sodium silicate, and then dry-heating or steam-heating the fiber material Thereafter, the fiber material is washed and dried in a conventional manner Printing is carried out according to a one-phase printing process which comprises printing a printing paste containing an acid binding agent such as sodium bicarbonate onto a fiber material and then dry-heating or steam-heating the printed fiber material, or according to a two-phase printing process which comprises printing a printing paste onto a fiber material and then treating it in a high-temperature bath of 90° C. or higher containing an inorganic salt such as sodium chloride and an acid binding agent such as sodium hydroxide and sodium silicate. Thereafter, the printed fiber material is washed and dried in a conventional manner. In these dyeing and printing processes, dyeing and printing auxiliaries such as level dyeing agents, retarding agents, dyebath lubricants, dyeing accelerators, dissolution assistants and the like may be used.

The granular type reactive dye composition in accordance with the present invention is excellent in storage stability, so that it can be stored for a long period of time or even at a relatively high temperature such as 35° C. or higher, without change in dye concentration and decomosition of the reactive group of the dye, and the dye composition even after storage can give the same color yield and dyeability as those given by the dye composition just after the production.

Moreover, the present dye composition is excellent in compatibility with water or hot water and solubility in water, and therefore it can make the dissolution procedure easy and simple and give a high reproducibility of the dyeing and printing.

The present invention will be illustrated in more detail by way of the following non-limitative examples, wherein parts and Percents are by weight.

EXAMPLE 1

A dye solution consisting of a dye (82 parts) represented by the following formula (1) in the free acid form:

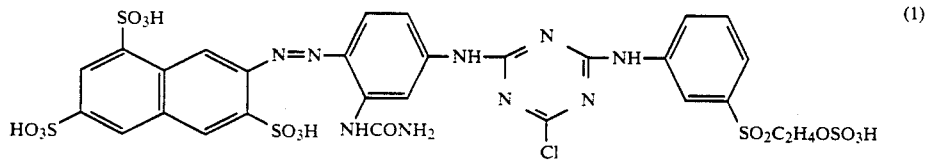

and sodium chloride (10 parts) and water (450 parts) was dried by means of a cylindrical spray drying apparatus, provided that inlet temperature was 230° C., outlet temperature was 100° C., and hot air velocity just under the spray was 8 m/second. By classifying the dried material according to known method, a granular reactive dye composition consisting of 82 parts of dye, 10 parts of sodium chloride and 8 parts of water and having a particle size ranging from 100 μm to 500 μm was obtained. When the composition was dissolved into 50 times its weight of water, the resulting solution had a pH value of 6.0.

When put to use after storage at 60° C. for one month, the granular reactive dye composition thus obtained gave reddish yellow colored dyed product and printed product of which color yield and hues were identical with those given by the same reactive dye composition just after preparation.

When the reactive dye composition was dissolved into water or hot water, the compatibility of dye with water or hot water was good, and the dissolution progressed rapidly, and the workability was good.

In this experiment, dyeing and printing using the reactive dye before and after storage were carried out in the following manner.

Dyeing Process 1

One hundred kilograms of a cotton knit was set in a liquid flow dyeing apparatus, and liquor ratio and temperature of the dyebath were adjusted to 1:12 and 60° C., respectively. After adding 3 parts of the reactive dye composition previously dissolved and 60 kg of anhydrous sodium sulfate according to known method, the fabric was treated at that temperature for 20 minutes and then 24 kg of sodium carbonate was added into the bath according to known method. Then, the fabric was treated at that temperature for 60 minutes to complete dyeing. The dyed product thus obtained was washed and dried according to conventional method.

Dyeing Process 2

Ten grams of the reactive dye composition was dissolved into hot water and cooled to 25° C. Then, 10 ml of 32.5% aqueous solution of sodium hydroxide and 150 g of 50° Baume water glass were added, and thereafter water was added to adjust the total volume to 1 liter at 25° C. Just after it, the resulting solution was used as a padding solution to pad a woven cotton fabric. The padded woven cotton fabric was wound up, tightly sealed with a polyethylene film, and allowed to stand at room temperature (20° C.) for 20 hours after which the dyed product was washed and dried in the usual manner.

Dyeing Process 3

Ten grams of the reactive dye composition was dissolved into hot water and cooled to 25° C. Then, 1 g of sodium alginate, 10 g of sodium m-nitrobenzenesulfonate and 20 g of sodium bicarbonate were added, and water was further added to adjust the total volume to 1 liter at 25° C. Just after it, the resulting solution was used as a padding solution to pad a woven cotton fabric. The padded woven cotton fabric was dried at 120° C. for 2 minutes an then steamed at 100° C. for 5 minutes to fix the dye. The dyed product thus obtained was washed dried and finished in the usual manner.

Printing Process

Ten grams of the reactive dye composition was dissolved into hot water. Then, 20 g of sodium alginate, 10 g of sodium m-nitrobenzenesulfonate and 20 g of sodium bicarbonate were added, and further water was added to adjust the total weight to 1 kg at 20° C. Just after it, the resulting mixture was used as a printing paste to print a woven cotton fabric, and it was dried. Then, it was steamed at 100° C. for 5 minutes to fix the dye. The printed product thus obtained was washed, dried and finished in the usual manner.

EXAMPLE 2

A dye solution consisting of a dye (90 parts) represented by the following formula (2) in the free acid form:

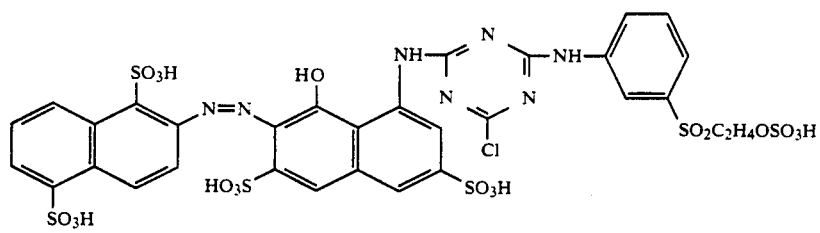

(2)

and anhydrous sodium sulfate (5 parts) and water (380 parts) was spray-dried under the same conditions as in Example 1, and the dried material was classified according to known method to obtain a granular reactive dye composition consisting of 90 parts of dye, 5 parts of anhydrous sodium sulfate and 5 parts of water and having a particle size ranging from 100 μm to 500 μm. When the reactive dye composition thus obtained was dissolved into 50 times its weight of water, the resulting aqueous solution had a pH value of 5.5.

When the granular reactive dye composition thus obtained was stored at room temperature for one year and then put to use, it gave red colored dyed product and printed product of which color yield and hues were identical with those given by the same reactive dye composition just after preparation.

When the reactive dye composition was dissolved into water or hot water, compatibility of the dye with water or hot water was good, and it dissolved rapidly, and the workability was good.

EXAMPLE 3

A solution consisting of a dye (90 parts) represented by the following formula (3) in free acid form:

according to known method to obtain a granular reactive dye composition consisting of 90 parts of dye, 3 parts of anhydrous sodium sulfate and 7 parts of water and having a particle size ranging from 250 μm to 800 μm. When the reactive dye composition herein obtained was dissolved into 50 times its weight of water, the resulting aqueous solution had a pH value of 6.5.

When the granular reactive dye composition thus obtained was stored at 40° C. for 2 months and then put to use, it gave blue colored dyed product and printed product of which color yield and hues were identical with those given by the same reactive dye composition just after preparation.

When the reactive dye composition was dissolved into water or hot water, compatibility of the dye to water or hot water was good and the dissolution progressed rapidly, and the workability was good.

EXAMPLE 4

A dye solution consisting of the dye (20 parts) represented by formula (1) of Example 1 in the free acid form, the dye (15 parts) represented by formula (2) of Example 2 in the free acid form, a dye (50 parts) represented by the following formula (4) in the free acid

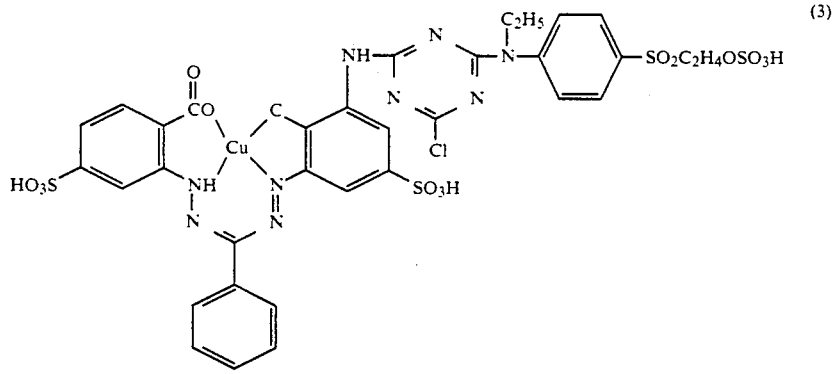

(3)

and anhydrous sodium sulfate (3 parts) and water (530 parts) was spray-dried under the same conditions as in Example 1, and the dried material was granulated in a fluidized bed according to known method and classified form:

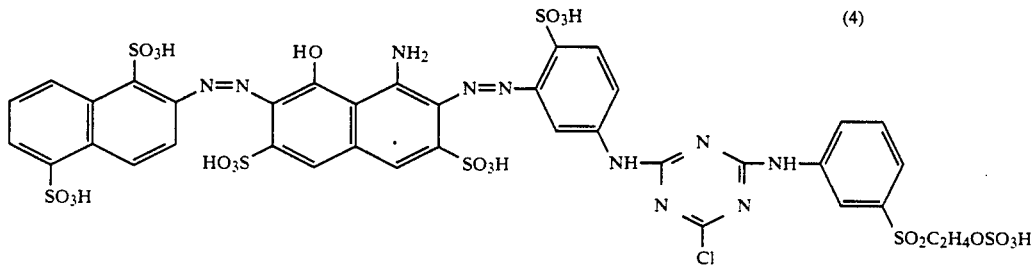

(4)

and sodium chloride 10 parts) and water (500 parts) was spray-dried under the same conditions as in Example 1 and classified according to known method to obtain a granular reactive dye composition consisting of 85 parts of dyes, 10 parts of sodium chloride and 5 parts of water and having a particle size ranging from 100 μm to 500 μm. When the composition was dissolved into 50 times its weight of water, the resulting aqueous solution had a pH value of 5.0.

The granular reactive dye composition herein obtained gave black colored dyed product and printed product of which color yield and hues were identical with those given by the same reactive dye composition just after preparation, even after being stored at 60° C. for one month.

When the composition was dissolved into water or hot water, compatibility of the dye into water or hot water was good, the dissolution progressed rapidly, and the workability was good.

EXAMPLE 5

A dye solution consisting of a dye (92 parts) represented by the following formula (5) in the free acid form:

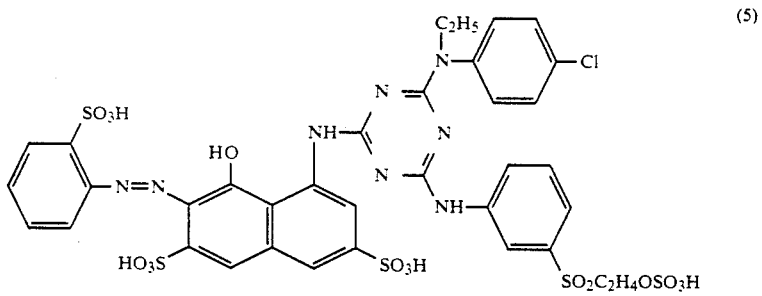

(5)

and anhydrous sodium sulfate (2 parts) and water (430 parts) was spray-dried under the same conditions as in Example 1, and the dried material was uniformly coated with one part of a mineral oil emulsion according to known method to obtain a granular reactive dye composition consisting of 92 parts of dye, 2 parts of anhydrous sodium sulfate, 5 parts of water and 1 part of mineral oil emulsion and having a particle size ranging from 150 μm to 500 μm. When the composition was dissolved into 50 times its weight of water, the resulting aqueous solution had a pH value of 4.5.

The granular reactive dye composition herein obtained gave red colored dyed product and printed product of which color yield and hues were identical with those given by the same composition just after preparation, even after the composition had been stored at 60° C. for one month.

When the reactive dye composition was dissolved into water or hot water, compatibility of the dye with water or hot water was good, and the dissolution progressed rapidly, and the workability was good.

EXAMPLE 6

To a dye solution consisting of a dye (86 parts) represented by the following formula (6) in the free acid form:

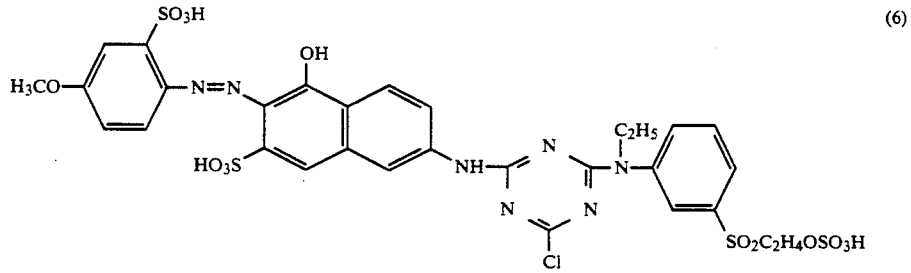

(6)

and anhydrous sodium sulfate (1 part) and water (480 parts) was additionally added a dispersing agent comprising naphthalenesulfonic acid (5 parts). The resulting mixture was dried by means of a cylindrical spray-drying apparatus at an inlet temperature of 240° C., at an outlet temperature of 100° C., and at a hot air velocity of 10 m/second as measured just under the spray, and then it was classified according to known method. Thus, a granular reactive dye composition consisting of 86 parts of dye, 1 part of anhydrous sodium sulfate, 8 parts of water and 5 parts of naphthalenesulfonic acid was obtained. When the composition was dissolved into 50 times its weight of water, the resulting aqueous solution had a pH value of 6.7.

The granular reactive dye composition herein obtained gave red colored dyed product and printed product of which color yield and hues were identical with those given by the same composition just after preparation, even after the reactive dye composition had been stored at 60° C. for one month.

When the composition was dissolved into water or hot water, compatibility of dye with water or hot water was good, the dissolution progressed rapidly, and the workability was good.

EXAMPLE 7

By repeating the procedure of Example 1, granular reactive dye compositions consisting of 82 parts of dye (varied), 10 parts of sodium chloride and 8 parts of water were prepared. Tables 1-4 list particle size of each reactive dye composition and pH value of aqueous solution obtained by dissolving each reactive dye composition into 50 times its weight of water.

Each granular reactive dye composition herein obtained gave dyed product and printed product of which color yield and hue were identical those given by the same composition just after preparation, even after being stored at 60° C. for one month.

When these reactive dye compositions were dissolved into water or hot water, compatibility of the dye with water or hot water was good, and the dissolution progressed rapidly, and the workability was good.

TABLE 1

| No. | Dye | Hue | Range of particle size | pH of aqueous solution |
|---|---|---|---|---|
| 8 | (structure) | Greenish yellow | 100 μm ~ 450 μm | 6.0 |
| 9 | (structure) | Greenish yellow | 100 μm ~ 500 μm | 5.5 |
| 10 | (structure) | Red | 100 μm ~ 500 μm | 5.4 |
| 11 | (structure) | Red | 120 μm ~ 520 μm | 7.0 |

TABLE 2
| No. | Dye | Hue | Range of particle size | pH of aqueous solution |
|---|---|---|---|---|
| 12 | 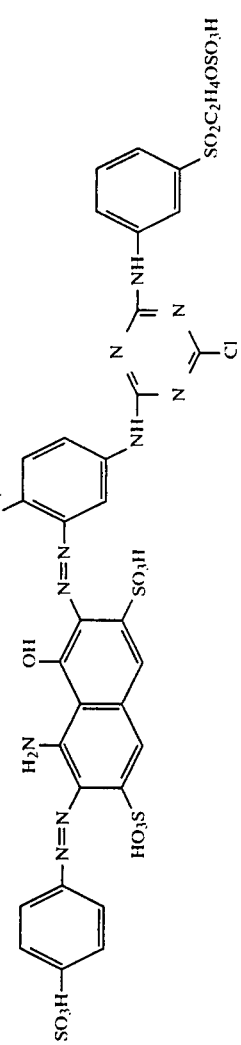 | Navy blue | 100 μm~500 μm | 6.0 |
| 13 | 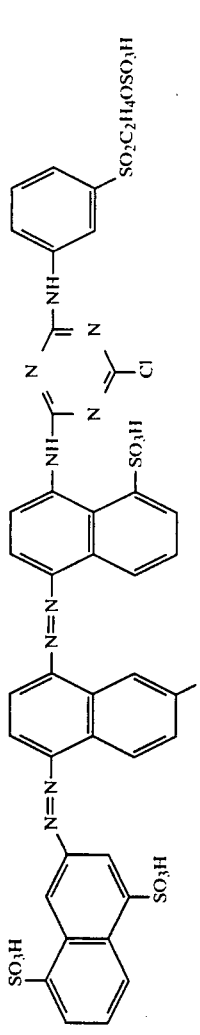 | Brown | 100 μm~500 μm | 5.5 |
| 14 | 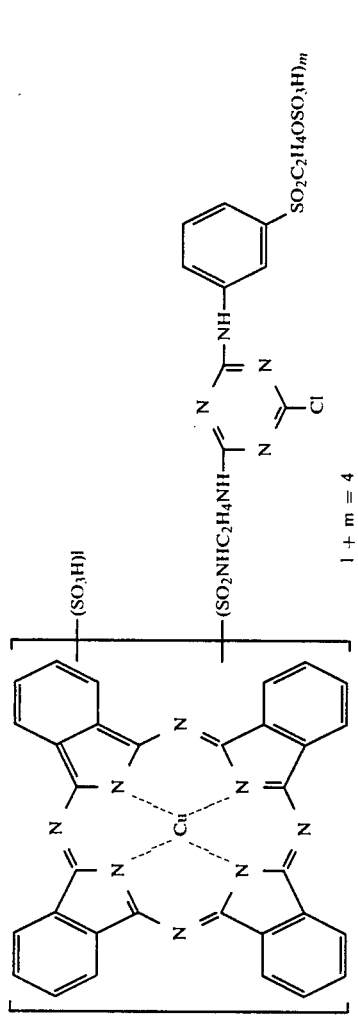 | Greenish blue | 100 μm~500 μm | 6.2 |

TABLE 3

| No. | Dye | Hue | Range of particle size | pH of aqueous solution |
|---|---|---|---|---|
| 15 | (structure) | Blue | 100 μm ~ 500 μm | 5.5 |
| 16 | (structure) | Yellow | 100 μm ~ 500 μm | 6.3 |
| 17 | (structure) | Red | 100 μm ~ 500 μm | 6.0 |
| 18 | (structure) | Yellowish red | 100 μm ~ 500 μm | 5.7 |

TABLE 4

| No | Dye | Hue | Range of particle size | pH of aqueous solution |
|----|-----|-----|------------------------|------------------------|
| 19 | (structure) | Red | 100 μm ~ 500 μm | 6.0 |
| 20 | (structure) | Blue | 100 μm ~ 500 μm | 6.0 |
| 21 | (structure) | Greenish yellow | 100 μm ~ 500 μm | 5.5 |
| 22 | (structure) | Bluish red | 90 μm ~ 550 μm | 5.7 |

What is claimed is:

1. A granular type reactive dye composition which comprises a reactive dye, an inorganic salt and water, the inorganic salt content being 20% by weight or less, the water content being from 4.5% through 15% by weight, based on the weight of the composition, the pH value of an aqueous solution prepared from the composition and water of 50 times as much as the weight of the composition being in the range of 3 through 8, the particle size of the composition being 60 to 1,000 μm, and the reactive dye being one having in the dye molecule at least one vinylsufone type fiber-reactive group represented by —SO$_2$CH=CH$_2$ or —SO$_2$CH$_2$CH$_2$Z, wherein Z is a group capable of being split by the action of an alkali.

2. A composition according to claim 1, wherein the water content is in the range of 5 through 10% by weight.

3. A composition according to claim 1, wherein the inorganic salt content is 10% by weight of less.

4. A composition according to claim 1, wherein the inorganic salt content is 5% by weight or less.

5. A composition according to claim 1, wherein the reactive dye is represented by the following formula (I) in the free acid form:

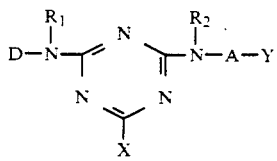

wherein D represents an organic dye residue having at least one sulfo group; R$_1$ and R$_2$ independently represent hydrogen or alkyl having 1 to 4 carbon atoms which is unsubstituted or substituted by a member selected from the group consisting of hydroxy, cyano, C$_1$-C$_4$ alkylcarbonyloxy, sulfo and sulfamoyl; A represents

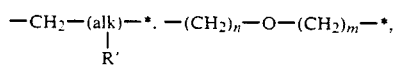

—(alk')—N—(alk')—*
       |
       R'' wherein * represents a bond linking

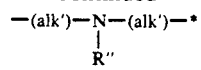

alk represents polymethylene having 1 to 6 carbon atoms or its branched isomer; R' represents hydrogen, chloro, bromo, fluoro, hydroxy, sulfato, acyloxy having 1 to 4 carbon atoms, cyano, carboxy, alkoxycarbonyl having 1 to 5 carbon atoms or carbamoyl; R'' represents hydrogen or alkyl having 1 to 6 carbon atoms; alk' represents, independently of one another, polymethylene having 2 to 6 carbon atoms or its branched isomer, provided that alk' and R' may be taken together to form a ring through a methylene group; n is an integer of 1 to 6; and m is an integer of 1 to 6, phenylene which is unsubstituted or substituted once or twice by at least one member selected from the group consisting of methyl, ethyl, methoxy, ethoxy, chloro, bromo and sulfo or naphthylene which is unsubstituted or substituted by sulfo; X represents halogen, pyridinio which is unsubstituted or substituted by a member selected from the group consisting of carboxy, carbamoyl, sulfo, halo and C$_1$-C$_4$ alkyl which is unsubstituted or substituted by hydroxy or sulfo, —NR$_3$R$_4$ or —OR$_5$, wherein R$_3$, R$_4$ and R$_5$ independently represent hydrogen, alkyl having 1 to 4 carbon atoms which is unsubstituted or substituted once or twice by C$_1$-C$_4$ alkyl, C$_1$-C$_4$ alkoxy, sulfo, carboxy, chloro or bromo, phenyl which is unsubstituted or substituted once or twice by C$_1$-C$_4$ alkyl, C$_1$-C$_4$ alkoxy, sulfo, carboxy, chloro or bromo, naphthyl which is unsubstituted or substituted once, twice or thrice by hydroxy, carboxy, sulfo, C$_1$-C$_4$ alkyl, C$_1$-C$_4$ alkoxy or chloro, or benzyl which is unsubstituted or substituted once or twice by C$_1$-C$_4$ alkyl, C$_1$-C$_4$ alkoxy, sulfo or chloro; and Y represents —SO$_2$CH=CH$_2$ or —SO$_2$CH$_2$CH$_2$Z in which Z represents a group capable of being split by the action of an alkali.

6. A method for dyeing or printing cellulose fibers, which comprises using the granular type reactive dye composition of claim 1.

* * * * *